United States Patent [19]

Ragi

[11] Patent Number: 5,413,674
[45] Date of Patent: May 9, 1995

[54] EVAPORATION FOR SOLIDS CONCENTRATION

[75] Inventor: Elias G. Ragi, Williamsville, N.Y.

[73] Assignee: UOP, Des Plaines, Ill.

[21] Appl. No.: 997,252

[22] Filed: Dec. 23, 1992

[51] Int. Cl.⁶ ............................................. B01D 1/26
[52] U.S. Cl. ................................. 159/47.3; 159/17.1;
    159/27.1; 159/DIG. 8; 159/DIG. 32; 162/29;
    165/133
[58] Field of Search ............... 159/47.3, DIG. 8, 17.1,
    159/24.2, DIG. 32, 16.3, 27.1; 165/133;
    202/174, 235; 162/29, 47

[56] References Cited

U.S. PATENT DOCUMENTS

| | | | |
|---|---|---|---|
| 1,582,067 | 4/1926 | Moore | 159/47.3 |
| 3,299,942 | 1/1967 | Jacoby | 159/47.3 |
| 3,384,154 | 5/1968 | Milton | 165/1 |
| 3,454,081 | 7/1969 | Kun et al. | 165/133 |
| 3,457,990 | 7/1969 | Theophilos et al. | 165/133 |
| 3,821,018 | 6/1974 | Grant | 117/94 |
| 3,906,604 | 9/1975 | Kakizaki et al. | 29/157.3 A |
| 3,951,753 | 4/1976 | Roller | 202/174 |
| 4,060,125 | 11/1977 | Fujie et al. | 165/133 |
| 4,064,914 | 12/1977 | Grant | 138/142 |
| 4,216,826 | 8/1980 | Fujikake | 165/133 |
| 4,424,098 | 1/1984 | Hartig | 203/89 |
| 4,700,771 | 10/1987 | Bennett et al. | 165/911 |
| 4,769,511 | 9/1988 | O'Neill | 585/715 |
| 5,143,579 | 9/1992 | Field et al. | 162/30.1 |

Primary Examiner—Virginia Manoharan
Attorney, Agent, or Firm—Thomas K. McBride; John G. Tolomei

[57] ABSTRACT

A black liquor process for paper pulping uses a nucleic boiling surface in a series of multi-effective evaporators. The nucleic boiling surface may be used to retube all effects or a single effect.

7 Claims, 4 Drawing Sheets

EVAPORATION FOR SOLIDS CONCENTRATION

BACKGROUND OF THE INVENTION

1. Field of the Invention

This invention relates to the field of heat exchangers. More specifically, this invention relates to heat exchangers for concentrating solids by the evaporation of liquids.

2. Discussion of the Prior Art

There are a variety of processes in which a solids containing stream is concentrated by the evaporation of liquids. In particular, multiple exchangers that operate as evaporators are used in desalination and the sugar industry to concentrate refined sugars into solid form, and have potential use in the mining industry for the concentration of ores in leaching operations and generally in the concentration of toxic materials from aqueous or other streams. One such evaporation step is in the treatment of black liquor from a papermaking process and more particularly relates to a process for concentrating black liquor from a Kraft process to a high solids content to enhance the usefulness of the material as fuel for soda recovery boilers.

The Kraft process is used extensively for the separation of clean cellulose fibers, known collectively as pulp, from various wood sources by dissolution of these fibers from small pieces of wood in a hot, strongly alkaline solution inside a vessel known as a digester. Typically, the liquid entering the digester is an aqueous solution consisting of a mixture of sodium sulfite ($Na_2S$), and sodium hydroxide (NaOH). The liquid exiting the digester consists of a weaker alkaline solution of approximately 15 wt. % total solids in an aqueous solution known as black liquor. This liquid consists of the inorganic materials fed to the digester plus the organic materials found in wood known collectively as lignin. The Kraft process continues by concentrating this dilute black liquor solution from a concentration of less than 20 wt. % to concentrations above 50% where the lignin can be consumed by combustion and the inorganics can be recycled.

The concentration of black liquor in the Kraft process is achieved by evaporation of water from the solution. The evaporation of this water is usually accomplished by heat transfer from steam on the shell side to the black liquor flowing upwardly on the tube side across a number of interconnected series flow vertical tubular heat exchangers. Such a series of heat exchangers is known as a multi effect evaporator (MEE), with each such heat exchanger known as an effect. MEE's are typically staged in pressures and associated temperatures. Typically the black liquor flow is from the lowest pressure to the highest, with concentration by boiling occurring in each effect. The evaporated water in each effect then can serve as the heat source for the next effect, operating at lower pressure and black liquor solids concentration. Typically, the evaporators operate as vertical thermosyphon exchangers.

Proper heat recovery in the concentration of solids promotes operational efficiency in the pulp and paper industry. The supply of steam to the effects, represents a direct and substantial operating expense to the pulp production process. Any increase in the heat transfer efficiency of the effects will directly reduce the operating cost of the process by lowering net steam consumption per pound of total water removed.

The high solids concentration of the black liquor presents a difficult challenge for the heat exchange service. Bare tube exchangers are prone to fouling. Regular cleaning is necessary to maintain suitable heat transfer performance.

It is known in the art that the surface of heat exchanger tubes can be treated to allow nucleate boiling. Such nucleate boiling surfaces can promote dramatic increases in the boiling film coefficients that are associated with heat transfer tubes in a boiling heat exchange zone. Such enhanced boiling surfaces for heat exchange tubes are discussed in U.S. Pat. Nos. 3,384,154; 3,821,018; 4,064,914; 4,060,125; 3,906,604; 4,216,826 and 3,454,081. Such surfaces have been known to provide benefits to a variety of processes. For example, a significant improvement in the refrigeration of an alkylation effluent by the use of an enhanced boiling surface is taught in U.S. Pat. No. 4,769,511. Such nucleate boiling surfaces have been known to increase boiling film heat transfer coefficients by a factor of 10 or more. It is also known that the use of one or more effects with an enhanced boiling service has improved the operation of multi-effect evaporators in the evaporation of water from ethylene glycol where the liquid streams are free of dissolved or undissolved solids.

Since liquid in a heat exchange tube begins to boil not when its bulk temperature reaches the boiling temperature, but when a tube wall temperature reaches the boiling temperature, dissolved or undissolved solids from the liquid can concentrate in localized areas near the tube wall. A nucleate boiling surface greatly increases localized boiling and therefore it was expected that such a surface would increase the concentration of solids on such surfaces while also locally drying micropores of the nucleate boiling surface. Thus, the combination of localized solids concentration and drying at the tube wall would lead one to anticipate fouling on the enhanced nucleate boiling surface and, after relatively short periods of time, reduce overall heat transfer relative to a bare tube wall.

BRIEF SUMMARY OF THE INVENTION

It has been surprisingly discovered that a multi-effect evaporator using an enhanced nucleate boiling surface will provide a sustained increase in heat transfer efficiency when evaporating a liquid from a high solids containing stream. The enhanced nucleate boiling surface operates at a reduced temperature difference between the bulk liquid and the tube wall that is sustained for a given overall temperature difference. The evaporator capacity is also higher than that of a bare tube, for a given overall temperature difference. The additional heat recovery from the nucleate boiling surface can be used to increase the overall throughput of the heat exchangers or to reduce energy capacity. Using the nucleate boiling surfaces to increase overall throughput has the advantage of raising the velocity of the solids containing liquid and thereby reducing fouling on the tube wall surfaces. This invention can be used in the replacement of heat exchange surfaces in existing exchanger arrangements as well as in new exchanger applications. Moreover substantial benefits are achieved with this invention whether one or all of the exchangers in a series of heat exchangers use the enhanced nucleate boiling surface. For instance, the use of a nucleate boiling surface in only one exchanger of a 6-heat exchanger arrangement can increase overall heat transfer for the series of heat exchangers by over 25%.

Thus, in one embodiment, this invention is a process for evaporating a liquid from a solution with a high dissolved and/or suspended solids content wherein the solution is heated in a series of heat exchangers by contact with a first heat exchange surface and heat from a heating medium that contacts a second heat exchange surface. The steam is used to evaporate liquid in one of the heat exchangers and can provide a vapor heat source to provide at least a portion of the heating medium in another heat exchanger. The process is improved by contacting the solution in at least one heat exchanger that uses an enhanced nucleate boiling surface formed on the first surface of the heat exchanger to increase the effectiveness of indirect heat transfer between the first heat exchange and the second heat exchange surface.

In another embodiment, this invention is a process for evaporating water from a paper pulp solution comprising a black liquor for the manufacture of paper. The process includes the steps of passing a first black liquor feed into a first vertical thermosyphon heat exchanger and indirectly heating the first black liquor with a first heating medium. The first heating medium comprises a first boiled liquid stream. Contact of the heat exchange medium and the black liquor in the first heat exchanger produces an intermediate black liquor feed and a second boiled liquid stream. The intermediate black liquor passes into at least one intermediate vertical thermosyphon heat exchanger and contacts a second heat exchange medium therein. The second heat exchange medium can be a third boiled liquid or a live steam stream. Contact of the intermediate black liquor feed with a heat exchange surface comprising a nucleate boiling surface heated by the third heating medium produces a second black liquor feed and at least a portion of the first boiled liquid stream. The second black liquor feed passes through a final thermosyphon heat exchanger and is indirectly contacted therein with a live steam stream across heat exchange surfaces to produce a black liquor product having a reduced concentration of solids relative to the first black liquor feed.

Other objects, embodiments and details of this invention are described in the following detailed description.

DETAILED DESCRIPTION OF THE INVENTION

This invention is generally directed to improving the operation of processes for the evaporative concentration of streams containing dissolved or undissolved solids. The improvement is obtained by the use of a nucleate boiling surface for the contacting of the solids containing liquid in at least one of a series of heat exchangers. It is desirable to the successful practice of this invention that the exchanger to which this improvement is applied is a vertical type heat exchanger. An essential feature of this invention is the use of an enhanced nucleate boiling surface on the portion of the exchanger in which the liquids containing dissolved or undissolved solids undergoes evaporation. In such exchangers it has been surprisingly discovered that the simple addition of the enhanced nucleate boiling surface to the heat exchange surface of only one exchanger or preferably effect in the series of heat exchangers will improve the overall heat transfer throughout the series of exchangers by as much as 25%. Although it is known that enhanced nucleate boiling surfaces can provide significant increases in the heat transfer coefficient in a boiling heat transfer zone, such a large increase in overall improvement was unexpected. It was particularly unexpected that such an improvement could be sustained while the nucleate boiling surface continuously contacted a liquid with a high concentration of solids.

This invention can be used in any type of heat exchanger. Such arrangements include horizontal or vertical shell and tube exchangers, plate type exchangers and plate and fin exchangers. Preferably, the invention will be used in a shell-and-tube type heat exchanger. More preferably, the invention will be used in a thermosyphon heat exchanger. The thermosyphon heat exchanger accomplishes natural circulation of the boiling medium by maintaining a sufficient liquid head on the boiling medium to promote high liquid recirculation in the boiling zone of the heat exchanger.

The addition of the enhanced nucleate boiling surface can be accomplished in a variety of ways. A number of patents related to such surfaces have been enumerated in the background of this invention. Typically, these enhanced nucleate boiling surfaces are incorporated on the tubes of a shell-and-tube type heat exchanger. These enhanced tubes are made in a variety of different ways which are well known to those skilled in the art. For example, such tubes may comprise annular or spiral cavities extending along the tube surface made by mechanical working of the tube. Alternately, fins may be provided on the surface. In addition the tubes may be scored to provide ribs, grooves, a porous layer and the like.

Generally, the more efficient enhanced tubes are those having a porous layer on the boiling side of the tube. The porous layer can be provided in a number of different ways well known to those skilled in the art. The most efficient of these porous surfaces have what are termed reentrant cavities that trap vapors in cavities of the layer through restricted cavity openings. In one such method, as described in U.S. Pat. No. 4,064,914, the porous boiling layer is bonded to one side of a thermically conductive wall. The porous boiling layer is made of thermally conductive particles bonded together to form interconnected pores of capillary size having an equivalent pore radius of less than about 6.0 mils, and preferably less than about 4.5 mils. As used herein, the phrase "equivalent pore radius" empirically defines a porous boiling surface layer having varied pore sizes and non-uniform pore configurations in terms of an average uniform pore dimension. Such an enhanced tube containing a porous boiling layer is commercially available under the tradename High Flux Tubing made by UOP, (Tonawanda, N.Y.).

An essential characteristic of the porous surface layer is the interconnected pores of capillary size, some of which communicate with the outer surface. Liquid to be boiled enters the subsurface cavities through the outer pores and subsurface interconnecting pores, and is heated by the metal forming the walls of the cavities. At least part of the liquid is vaporized within the cavity and resulting bubbles grow against the cavity walls. Vapor eventually emerges from the cavity through the outer pores and then rises through the liquid film over the porous layer for disengagement into the gas space over the liquid film. Additional liquid flows into the cavity from the interconnecting pores and the mechanism is continuously repeated.

When using an enhanced boiling surface other than a porous layer, the boiling film heat transfer coefficient is typically increased by a factor of about 4 or more to a value of at least about 400 BTU/hr/ft$^2$/° F. By utilizing this enhanced boiling surface, containing a porous boiling layer, the boiling film heat transfer coefficient of the boiling fluid within the tubes can be increased by a factor of about 10, typically to a value of 700 BTU/hr/ft$^2$/° F) or more. This is due to the fact that the heat leaving the base metal surface of the tube does not have to travel through an appreciable liquid layer before meeting a vapor-liquid surface producing evaporation. Within the porous layer, a multitude of bubbles are grown so that the heat, in order to reach a vapor liquid boundary, need travel only through an extremely thin liquid layer having a thickness considerably less than the minute diameter of the confining pore. Vaporization of the liquid takes place entirely within the pores.

In addition to adding the enhanced nucleate boiling surface, other enhancements of the heat exchange surfaces in different heat transfer zones of the exchanger may also be used. For example, other surfaces can be added in the condensing zone to further promote condensing of the steam or boiled liquid on the tube surface. Known methods for enhancing a condensing surface include the use of a "sand grain" surface that has large heat conductive particles on the heat exchange surface to provide local cold spots that will initiate condensation. Other enhancements that can be used would be in the gas heat transfer zones. Some examples of known enhancements include twisted tape inserts or low fin tubing, each of which increase the heat exchange surface for the transfer of sensible heat in the gas zones. One particularly preferred advancement is a fluted tube. A fluted tube has an arrangement wherein flutes in an arrangement of longitudinally extending ribs provide a continuous curvature between crest and valley portions. Here the curvature at the crest of the flutes enables surface tension forces to exert a pressure which substantially thins the liquid film and makes the liquid drain into the valley between flutes. Drainage and liquid accumulation is assisted by the negative curvature of the valleys. By virtue of the thin liquid films on the upper half of the flutes, very attractive condensing coefficients can be obtained. Such additional enhancement surfaces would increase the overall heat transfer capability of the exchanger and further increase heat recovery without changing any of the benefits of the enhanced nucleate boiling surface as discussed above.

Whether the enhanced nucleate boiling surface is used in old or new heat exchangers, there are few restrictions on its application. The only essential element of the invention is that the enhanced nucleate boiling surface be provided in the boiling zone of the heat exchanger. The boiling zone in the corresponding enhanced nucleate boiling surface can be used on most types of heat exchange surfaces. In the case of a shell-and-tube type heat exchanger, the enhanced nucleate boiling surface may be placed on either the inside or outside of the tubes. However, it is generally preferred to place the enhanced nucleate boiling surface and have boiling occur on the inside of the tubes in a vertical shell-and-tube type heat exchanger. Also, the enhanced nucleate boiling surface should extend throughout the entire boiling zone to obtain maximum benefit from the invention. This means that in a typical heat exchanger tube the entire length of the tube will be coated with the enhanced nucleate boiling surface.

EXAMPLE 1

Figure 2:
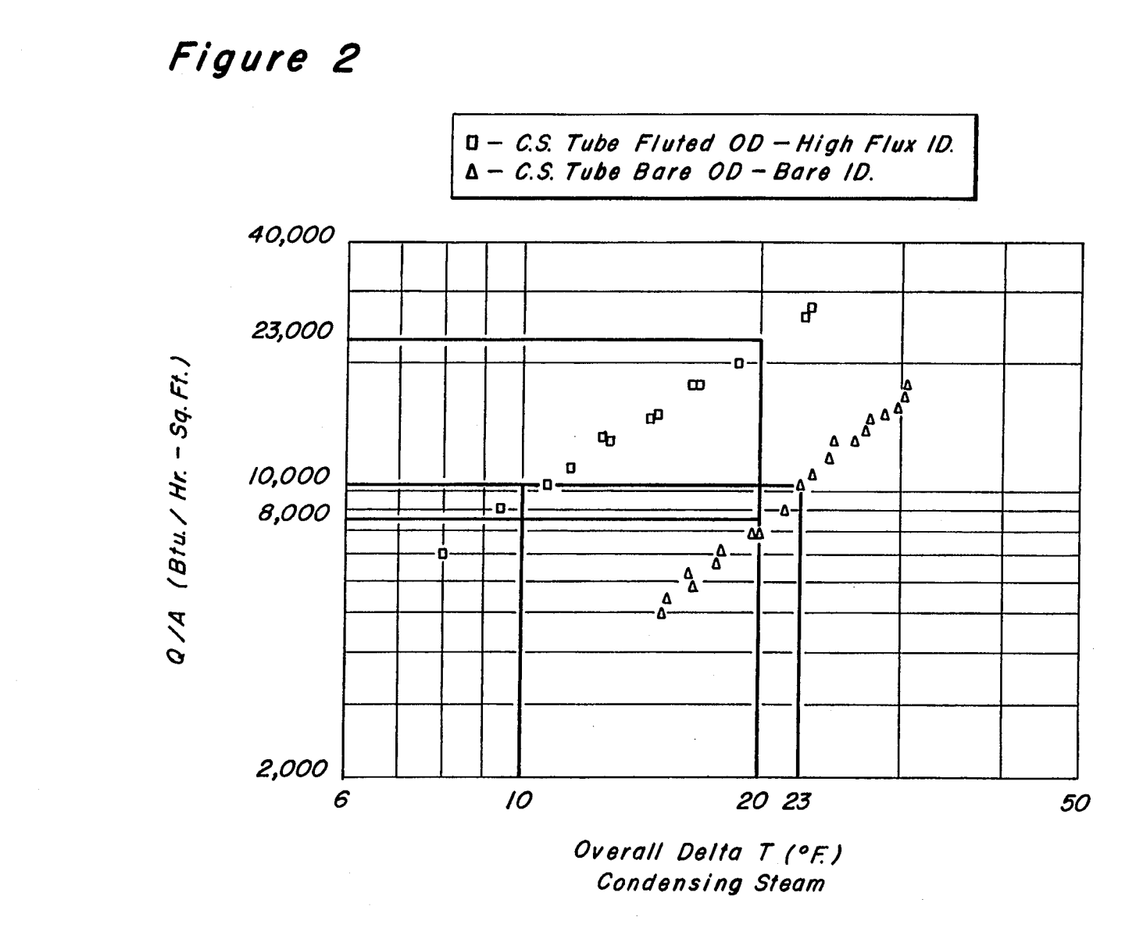
FIG. 2 is a graph comparing heat transfer coefficients for different tube surfaces.

The surprising benefit of adding the enhanced nucleate boiling surface in the boiling zone of the effects can be more fully appreciated by the curve for the nucleate boiling surface performance shown in FIG. 2. FIG. 2 provides a comparison of a bare tube and a tube containing a nucleate boiling surface. The heat exchange was performed to boil black liquor having 15.9% solids on the tube side of heat exchange tube at 10 psig and an inlet temperature of 244° F. The outside of the heat exchange tube was contacted with 20 psig steam at an inlet temperature of 258° F. The tube operated as a 5-foot vertical thermosyphon type exchanger at temperatures ranging from 212°-320° F. Black liquor passed through the tube at a rate determined by the natural circulation of the black liquor with steam passing through condensing portion of the tube at a rate of 25 lbs/hr. The tube is 1¼ inch in diameter and made from carbon steel and was the same in both examples except for the use of fluting on the O.D. and high flux on the I.D. of the tube representing the heat transfer operation of the this invention. As FIG. 2 shows, at a constant $\Delta T$ of 20° F., the heat transfer tube of this invention provided an almost 3-fold increase in the overall heat transfer coefficient for the tube. Looking at the advantage of the tube in terms of $\Delta T$ improvement, FIG. 2 also demonstrates that at a constant heat transfer rate of 10,000 BTU/hr/ft$^2$, the tubes of this invention more than double the $\Delta T$ of the condensing steam as it contacts the black liquor.

Figure 3:
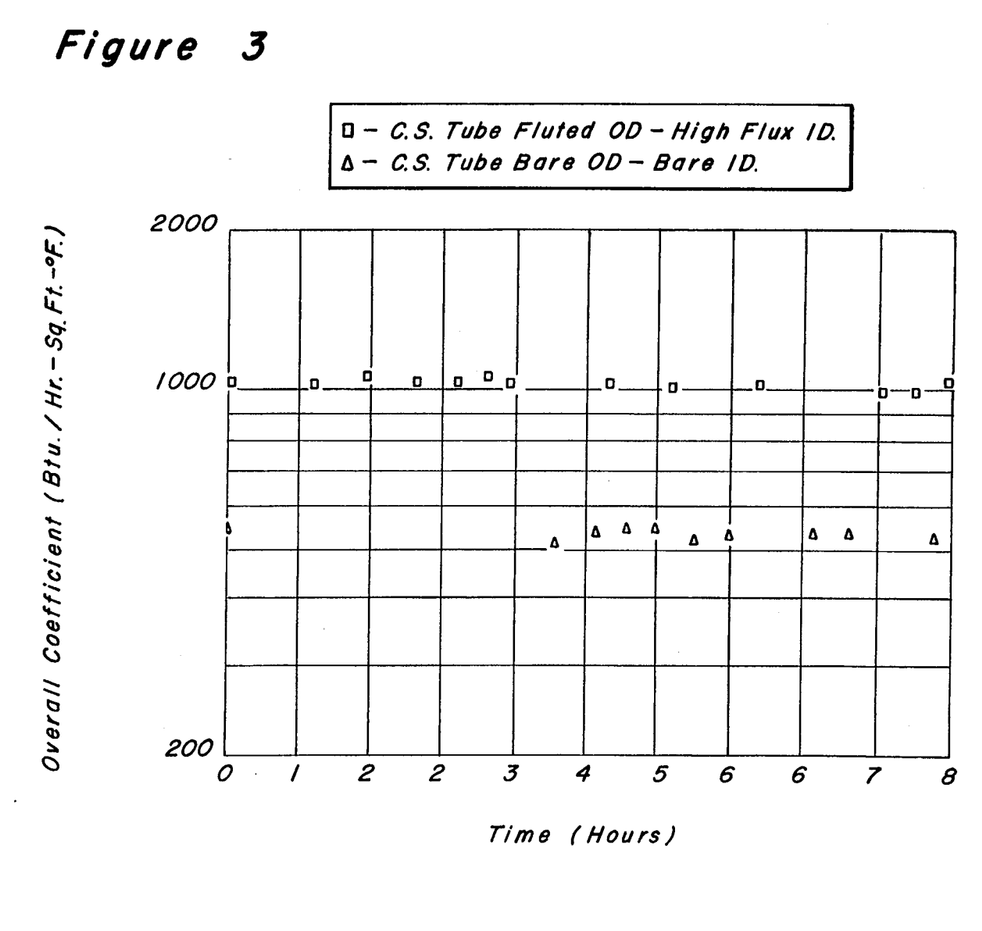
FIG. 3 is a graph comparing the stability of heat transfer coefficients for different tube surfaces.

It has also been discovered that Applicant's invention consistently maintains the improvement in the overall heat transfer coefficient for sustained periods of time. FIG. 3 demonstrates the operation of the same thermosyphon heat exchanger for which results were presented in FIG. 2. As FIG. 3 shows, the tube of this invention in black liquor service provided an approximate doubling of the overall heat transfer coefficient with no appreciable drop-off of the heat transfer coefficient in the enhanced boiling surface tube over time. Thus, the heat transfer tubes of Applicant's invention will provide consistent improvement in heat transfer coefficient despite the presence of a high solid loading in the black liquor.

EXAMPLE 2

Figure 4:
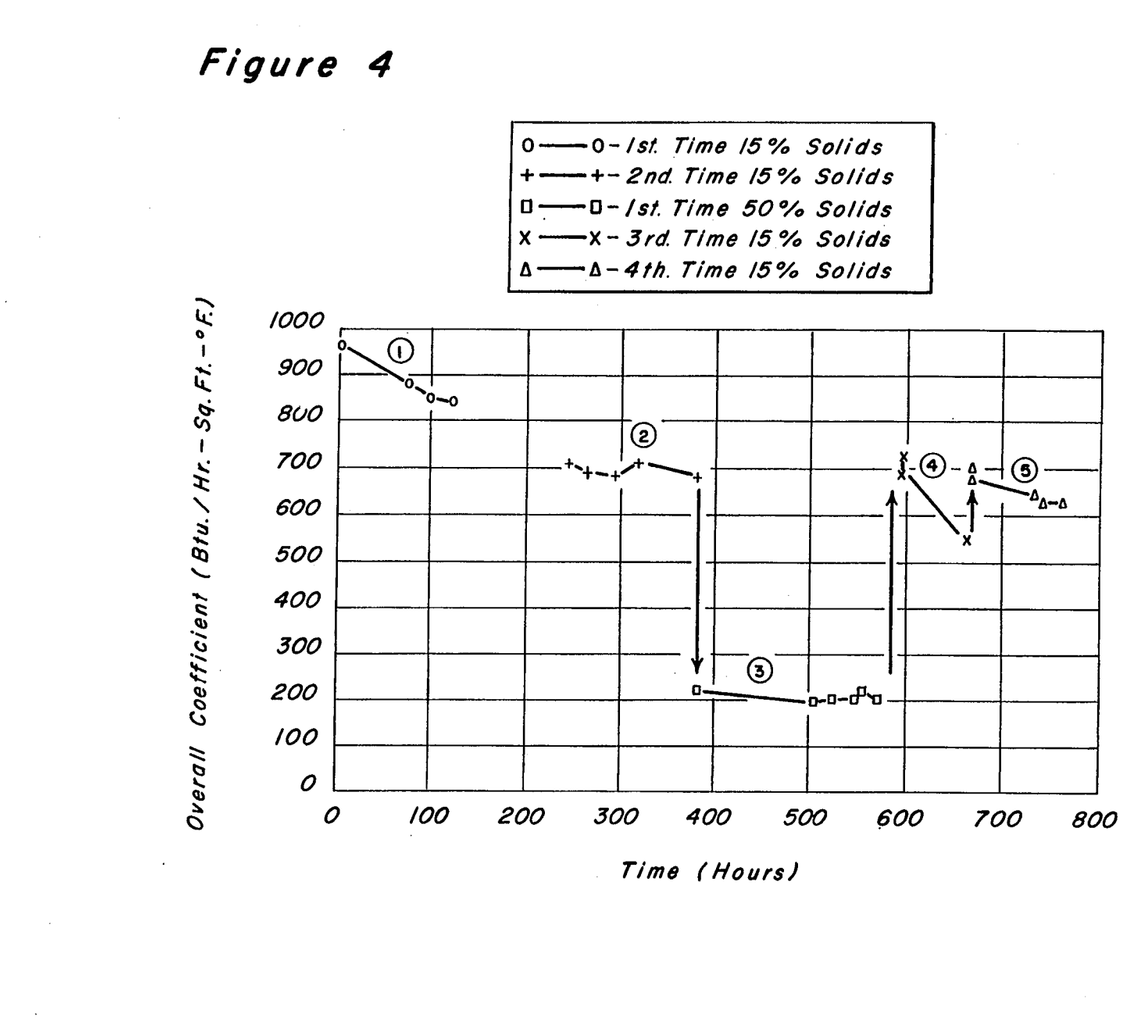
FIG. 4 is a graph showing performance of a tube of this invention under different solids loadings.

The effects of continued operation on the tube with the high flux I.D. and fluted O.D. are shown in this example. The tube was operated over an extended period of time with varied solids concentrations at a temperature of about 238° F. and a pressure of from 6 to 10 psig on the boiling side of the tube and temperatures and pressures ranging from about 20 to 35 psig and 257° to 280° F. on the steam side of the tube. FIG. 4 graphically depicts the results over 800 hours of operation.

Looking then at the graph, the operational history presents a continued record of high heat exchange performance. The performance record starts with an initial period of operation shown by section 1 of the curve where a black liquor with a 15% solids concentration passed through a clean tube. The overall coefficient of heat transfer defined by the operational data shows a gradual decline from about 1000 to about 840 BTU/hr/ft$^2$/° F over a period of about 125 hours. This gradual overall reduction in the heat transfer coefficient is typical of the normal reduction in heat transfer that occurs during the initial operating time of any heat transfer tube.

After about 230 hours of operation, the overall coefficient stabilized at a value of about 700 BTU/hr/ft$^2$/° F as shown by a section 2 of the curve. The break between curve sections 1 and 2 corresponds to a period during which during which data was not recorded and there was an undetected vapor leak that caused a reduction in the liquid level of the apparatus and an increase in the solids concentration. Once the liquid level and 15% solids concentration were restored, the overall heat transfer value remained stable through about 400 hours of operation. Although the data shows a decline of about 250 BTU/hr/ft$^2$/° F in the overall heat transfer coefficient from the initial value to the stabilized value, such reductions are ordinarily encountered with any new heat exchange surface. The important fact is that the tube provides continued heat transfer operation at a very high overall coefficient of about 700 BTU/hr/ft$^2$/° F.

Section 3 of the curve depicts the effect of a greatly increased solids concentration on the overall coefficient. After adjustment of the black liquor solids concentration to 50%, the overall coefficient stabilized at a value of about 200 BTU/hr/ft$^2$/° F. This coefficient is still substantially higher than the coefficients normally encountered with such high black liquor solids concentrations.

Section 4 of the curve further establishes that lower overall coefficient caused by the higher solids concentration caused no permanent fouling of the tubes. At the start of section 4, the solids concentration in the black liquor was restored to 15%. The rapid return of the overall coefficient to the prior level at the prior 15% solids loading evidences the absence of any permanent fouling and the overall stability of the tube operation. Over the period of section 4, the overall coefficient fell gradually as the solids concentration was permitted to slowly rise to 24%. Again, as shown by Section 5, the overall coefficient rapidly returned to the level associated with the prior 15% solids level upon restoration of the solids concentration to 15%. The end of section repeats the slow decline in overall coefficient from a gradual increase in the black liquor solids concentration.

Although the data presented in FIGS. 2, 3 and 4 apply generally to a black liquor process, this invention can be applied for the heat exchange of a number of liquids containing a high concentration of dissolved or undissolved solids. Preferably, the undissolved or dissolved concentration of solids in the streams will range from 1 to 65% and more preferably from 10 to 50%. In the case of black liquor, the minimum concentration will usually be about 13% and more typically 15%.

Looking then to a paper pulping process, by way of example but not limitation, the heat exchanger arrangement for concentration of the black liquor solids will use several multi-effect evaporators. The number of evaporators will usually range from 3 to 10. Typically, the multi-effect evaporators will include at least 6 heat exchangers. The black liquor having an initial concentration of solids of from 10 to 20% will, after passage through the multi-effect evaporators, have a final concentration of from 40 to 65 wt. % solids. Therefore, the concentration of solids in the black liquor is usually increased from less than 20 wt. % to at least 50 wt. %. The black liquor will normally enter the process at a temperature of about 125° F. Live steam is the typical heat input to the multi-effect evaporators. In most cases, the steam is low pressure in a range of from 30 to 50 psi and a temperature in a range of from 220°–300° F.

Figure 1:
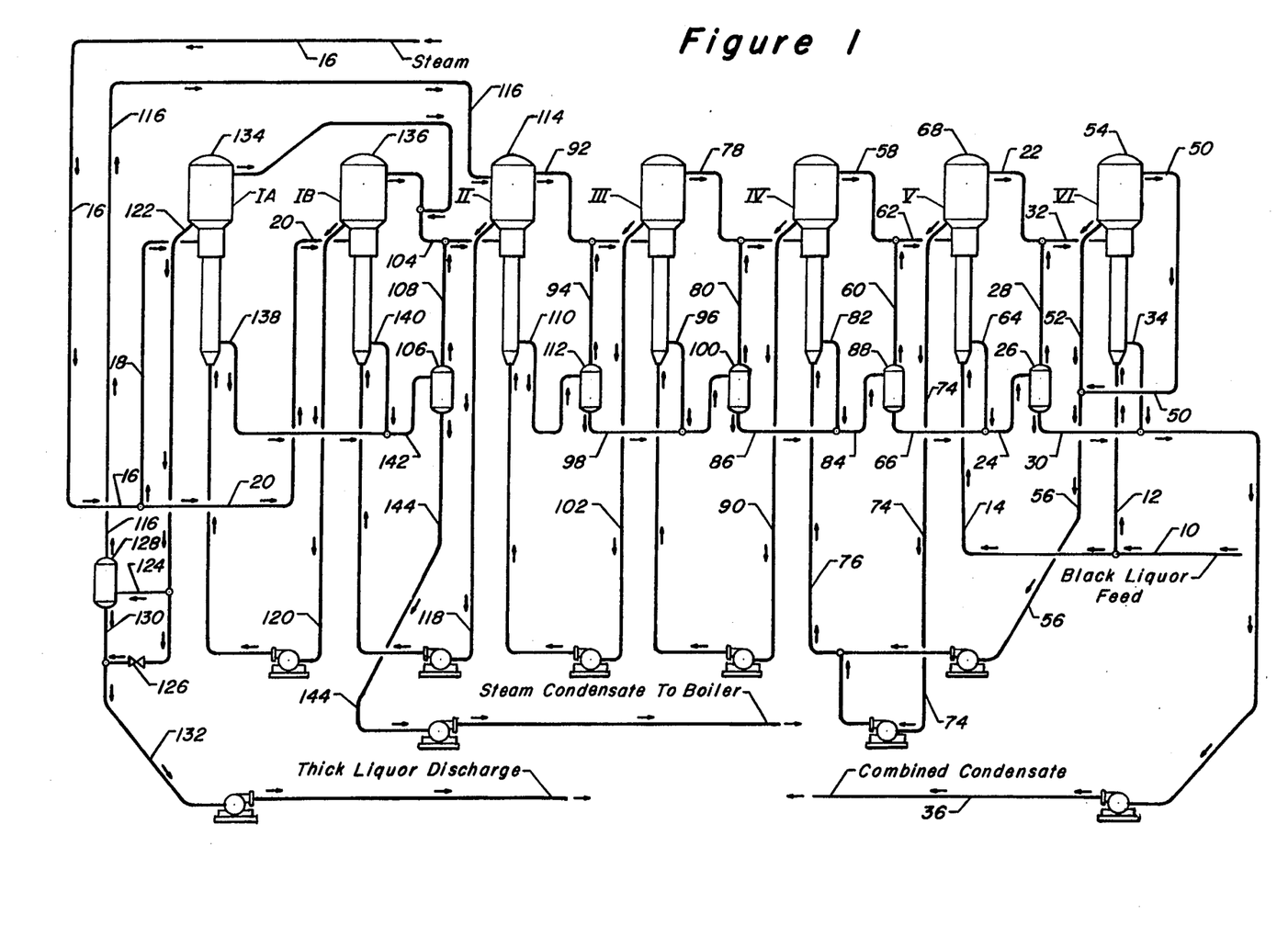
FIG. 1 is a simplified schematic flowscheme of a multi-effect evaporator arrangement for treating a black liquor.

FIG. 1 shows a typical arrangement for the multi-effect evaporators of this invention. When this invention is used to provide a nucleate boiling surface in a single retubed evaporator, the external configuration of the multi-effect evaporator system will remain substantially the same. The general operation of a multi-effect evaporator, typical of those practiced by the prior art, is presented in Example 1. The system of effects is shown in schematic form and does not include all pumps, valves, controllers, and other equipment used in such systems but well known to those skilled in the art. The following examples are based in part on computer simulations and engineering calculations that are derived from operating units.

EXAMPLE 3

Looking then at FIG. 1, countercurrent contacting of a black liquor having 13.9 wt. % solids, begins as the liquor enters the process through a line 10 at a rate of 333,000 lbs/hr. The entering feed is split equally between streams 12 and 14 which enter the tube side of Effects VI and V, respectively. The other heat input to the process comprises live steam entering the process through a line 16 at a rate of 51,200 lbs/hr and a pressure and temperature of 31.5 psig and 276°, respectively. 20,500 lbs/hr of live steam enters the shell side of Effect IA through a line 18 while the remainder of the live steam enters the shell side of Effect IB through a line 20. All of the exchangers have bare tubes that are 26 feet in length and 2 inches in diameter. Live steam produces boil-up which in turn produces more boil-up through the remaining effects and ultimately contacts the black liquor in Effects V and VI. Vapor is flashed from a condensate stream 24 in a flash drum 26 to produce a vapor stream 28 and a liquid stream 30. Stream 28 is combined with the boil-up from line 22 to produce a stream 32 that enters the shell side of Effect VI. Condensation of the vapor from line 32 in Effect VI produces a condensate withdrawn from Effect VI through a line 34 and combined with condensate from line 30 into a combined condensate stream withdrawn from the process through line 36. 44,000 lbs/hr of vapor boiled from the black liquor in the tube side of Effect VI is collected as liquid by a conduit 50. A line 52 withdraws an intermediate stream of black liquor from vapor collection zone 54 of Effect VI. A line 56 combines the concentrated black liquor from line 52 and the liquid from line 50. Black liquor concentrations and temperature conditions as well as vapor stream conditions, mean temperature differential (MDT) heat transfer coefficients, as well as total heat transfer rates and tube areas are given in Table 1 for each effect.

TABLE 1

OPERATING CONDITIONS FOR MULTIPLE EFFECT
EVAPORATORS IN THE CONCENTRATION OF BLACK LIQUOR

| EFFECT | IA | IB | II | III | IV | V | VI |
|---|---|---|---|---|---|---|---|
| Black Liquor Conc., % solids | | | | | | | |
| In | 42.3 | 34.2 | 25.9 | 21.1 | 18.3 | 13.9 | 13.9 |
| Out | 51.2 | 42.3 | 34.2 | 25.9 | 21.1 | 17.8 | 18.9 |
| Temperature, °F. | | | | | | | |
| In | 250 | 225 | 203 | 181 | 158 | 128 | |
| Out | 252 | 250 | 225 | 203 | 181 | 158 | 128 |
| Vapor | Live Steam | Live Steam | Boil-up | Boil-up | Boil-up | Boil-up | Boil-up |
| Cond. Pres., PSIA | 46.2 | 46.2 | 24.1 | 15.9 | 10.6 | 6.7 | 3.3 |
| Cond. Temp., °F. | 276 | 276 | 238 | 216 | 196 | 175 | 152 |
| MTD, °F. | 24 | 26 | 13 | 13 | 15 | 17 | 24 |
| $U_{bare\,b}$ BTU/hr/ft²/°F. | 174 | 242 | 392 | 386 | 316 | 240 | 190 |
| Q, MMBTU/hr | 18.434 | 27.805 | 44.942 | 44.065 | 41.886 | 35.926 | 40.049 |
| A, Ft² | 4,400 | 4,400 | 8,800 | 8,800 | 8,800 | 8,800 | 8,800 |
| $(Q/A)_{bare\,t}$ BTU/hr/FT² | 4,190 | 8,274 | 5,107 | 5,007 | 4,737 | 4,082 | 4,551 |

The other portion of feed from line 10 carried by line 14 enters Effect V where in a manner similar to Effect VI it is contacted with boil-up and flashed vapors from lines 58 and 60, respectively, which provide a shell side, heated vapor stream 62 that enters Effect V. A line 64 withdraws condensed boil-up from the shell side of Effect V for combination with condensed liquid from a line 66 to provide condensate for line 24. The upper portion, 68, of Effect V collects 36,045 lbs/hr of boil-up which is transferred to Effect VI by line 22. Another intermediate stream of black liquor carried by line 74 having an increased solids concentration relative to that in line 14 and a mass flowrate of 130,000 lbs/hr is combined with 123,000 lbs/hr of black liquor from line 56 into an intermediate black liquor feed carried by a line 76 to Effect IV.

Indirect contact of the black liquor from line 76 in Effect IV with boil-up and flashed vapors from lines 78 and 80, respectively, produces 33,000 lbs/hr of vapor for the boil-up carried by line 58 and a condensate stream carried by a line 82. A line 84 combines condensate from line 82 and a line 86 which flashes in a vessel 88 to produce the vapor carried by line 60 and condensate taken by line 66. A line 90 passes an additional 220,000 lbs/hr of an intermediate black liquor feed to Effect III. Contact of the black liquor in Effect III with boil-up from a line 92 and flashed vapor from a line 94 produces 40,700 lbs/hr of boil-up carried by line 78 and condensate transferred by a line 96 into combination with the condensate from a line 98 for flashing in a vessel 100. A line 102 transfers 179,000 lbs/hr of another intermediate black liquor feed to Effect II. In Effect II, boil-up from a line 104 in combination with 2,000 lbs/hr of flashed vapor taken from a vessel 106 by a line 108 indirectly contacts the black liquor to produce a condensate stream taken by a line 110 to a flash vessel 112. In addition to the heated black liquor entering an upper collection zone 114 of Effect II, flashed vapor carried by a line 116 enters the upper section of the vapor collection zone 114 to provide 43,000 lbs/hr of boil-up taken by line 92. 136,000 lbs/hr of intermediate black liquor feed taken from Effect II by a line 118 passes into Effect IB where it indirectly contacts the previously described live steam stream carried by line 20.

A black liquor feed collected from Effect IB passes via a line 120 to Effect IA at a mass flow of 110,000 lbs/hr. Indirect contact of the live steam carried by line 18 with the black liquor in Effect IA produces 90,600 lbs/hr of black liquor at a solids concentration of 51.2% carried by line 122 and split between lines 124 and 126. The portion of black liquor from line 124 enters flash vessel 128 that produces the flashed vapor carried by line 116 and a further concentrated bottoms stream of black liquor taken by a line 130 into combination with black liquor from line 126 to produce 89,200 lbs/hr of a black liquor product with a 52% solids concentration. Line 132 withdraws the black liquor from the process. 19,000 lbs/hr of boil-up collected from the vapor collection 134 of Effect IA and 26,000 lbs/hr of vapor collected from the vapor zone 136 of Effect IB are combined to provide the boil-up carried by line 104. Condensate taken by lines 138 and 140 from Effects IA and IB, respectively, flow into a line 142 that feeds flash drum 106 and produces 49,210 lbs/hr of steam condensate taken by a line 44 at 238° F. and 9.4 psig.

EXAMPLE 4

The following example illustrates the benefits gained by application of the invention in replacement of a single heat exchanger effect with tubes containing a High Flux boiling surface. Each effect again has the tube surface listed in Table 1. All of the exchangers in this example have the same tube configuration except for Effect IB which was retubed to provide the nucleate boiling surface of this invention. Effect IB was retubed with 26, 2 inch diameter tubes. The heat transfer calculation for the retubed effect was based on heat transfer coefficient of 1000 BTU/hr/ft²/° F. All the new tubes are 26 ft long with a High Flux boiling surface on the entire interior and a fluted surface on the entire exterior.

The High Flux surface substantially increases the overall heat transfer coefficient in the evaporation zone. The calculated U-values for each of the effects is shown in Table 2. The High Flux exchanger was calculated to have an overall U-value for the entire exchanger of about 1000 BTU/hr/ft²/° F. The existing effects in operation had overall heat transfer coefficients of about 174 to 392 BTU/hr/ft²/° F.

The evaporator effects representative of the prior art have an overall heat transfer of 252 MMBTU/hr. By retubing Effect IB in accordance with this invention, the total heat transfer increased to 314 MMBTU/hr. The process in both examples was operated to maintain a constant ΔT across the entire series of effects which totalled 132° F. However, by comparison, the retubing of Effect IB reduced the ΔT on the one exchanger thereby providing additional ΔT to raise the overall heat exchange from all of the effects. Thus, the use of the nucleate boiling surface in even one effect in the multi-effect system greatly increases heat transfer in the entire system. Referring again to Table 2, the overall heat transfer coefficients for the remainder of the effects that did not use the High Flux surface also increased relative to the uncoated case because of the increased ΔT. More importantly the overall heat duty between the two cases increased by 25%. The 62.2 million BTU's gained in Example 3 represents a significant fuel savings.

TABLE 2

| EFFECT | RETUBING EFFECT IB WITH HIGH FLUX TUBING | | | | | | |
|---|---|---|---|---|---|---|---|
| | IA | IB | II | III | IV | V | VI |
| EVAPORATOR EFFECTS EXAMPLE 1 | | | | | | | |
| Q, MM Btu/hr | 18.434 | 27.605 | 44.942 | 44.065 | 41.686 | 35.926 | 40.049 |
| U BTU/hr/ft$^2$/°F. | 174 | 242 | 392 | 386 | 316 | 240 | 190 |
| T, °F. | 24 | 26 | 13 | 13 | 15 | 17 | 24 |
| Area, Ft$^2$ | 4,400 | 4,400 | 8,800 | 8,800 | 8,800 | 8,800 | 8,800 |
| RETUBE ONE OF THE EFFECTS EXAMPLE 2 | | | | | | | |
| Q | 21.98 | 34.32 | 57.728 | 56.742 | 52.272 | 44.0 | 47.872 |
| U | 185 | 1,000 | 410 | 403 | 330 | 250 | 200 |
| T | 27 | 7.8 | 16 | 16 | 18 | 20 | 27.2 |
| T Increase (decrease) °F. | 3 | (18.2) | 3 | 3 | 3 | 3.2 | 3.2 |
| Area, Ft$^2$ | 4,400 | 4,400 | 8,800 | 8,800 | 8,800 | 8,800 | 8,800 |

We claim:

1. A continuous process for evaporating water from a solution containing solids, said solution comprising a black liquor from the manufacture of paper, said process comprising, (a) passing a first black liquor feed into a first vertical thermosyphon heat exchanger that functions as an evaporator for the evaporation of water from the black liquor feed and indirectly heating said first black liquor feed with a first heating medium comprising a first boiled liquid stream by contacting said first black liquor feed with a first heat exchange surface and contacting said first heat exchange medium with a second heat exchange surface in said first heat exchanger to produce an intermediate black liquor containing at least 15 wt % solids and a second boiled stream comprising water evaporated from said first black liquor feed;

(b) passing said intermediate black liquor to at least one intermediate vertical thermosyphon heat exchanger that functions as an evaporator for the evaporation of water from the intermediate black liquor and indirectly contacting said intermediate black liquor with a second heat exchange medium comprising at least one of a third boiled liquid stream and a live steam stream by contacting said intermediate black liquor with a third heat exchange surface comprising a nucleate boiling surface and said second heat exchange medium with a fourth heat exchange surface to produce a second black liquor feed and at least a portion of said first boiled stream which comprises water evaporated from said intermediate black liquor; and, (c) passing said second black liquor feed to a third vertical thermosyphon heat exchanger that functions as an evaporator for the evaporation of water from the second black liquor feed and indirectly contacting said second black liquor feed with live steam by contacting said second black liquor feed with a fifth heat exchange surface and said live steam with a sixth heat exchange surface in said third heat exchanger to produce a black liquor product having an increased concentration of solids relative to said first black liquor feed and at least a portion of said third boiled liquid stream which comprises water evaporated from said second black liquor feed.

2. The process of claim 1 wherein said nucleate boiling surface is a High Flux boiling surface comprising a surface layer of reentrant openings.

3. The process of claim 1 wherein the concentration of solids in said black liquor is increased from less than 20 wt. % to at least 50 wt %.

4. The process of claim 1 wherein said first and said fifth heat exchanger surfaces further include a nucleate boiling surface.

5. The process of claim 1 wherein said live steam has a temperature of at least 220° F. and a pressure less than 50 psia.

6. The process of claim 1 wherein said black liquor passes through a series of at least six heat exchangers.

7. The process of claim 1 wherein the black liquor product has a concentration of 40 to 65 wt % solids.

* * * * *